Patented May 31, 1932

1,861,398

UNITED STATES PATENT OFFICE

RICHARD LANT, OF VIENNA, AUSTRIA

AQUEOUS EMULSIONS OF HYDROCARBON OILS AND PROCESS FOR MANUFACTURING THE SAME

No Drawing. Application filed November 13, 1930, Serial No. 495,533, and in Austria March 29, 1930.

The main object of the present invention is to provide highly dispersed and exceedingly stable emulsions of hydrocarbon oils such as are for instance used as lubricants in working metals (boring oils, cutting oils) and furthermore for certain purposes of the textile industries (spike oils or wool oils).

The new aqueous emulsions of hydrocarbon oils according to the invention show the objective criteria that they contain a colloidally disperse system of potassium oleate, glycerine and hydrcarbon oils in such a homogeneous dispersion, that the bulk of the system will after drying up of the emulsion remain in a reversible state. Preferably this system ought to contain for each part by weight of potassium oleate at least two parts by weight of glycerine. The oleic acid and the potassium cannot be replaced by other fatty acids and other cations respectively without decreasing the effect. Other polyvalent alcohols (such as for instance glycols) cannot be used instead of the glycerine; a like result is only obtained with compounds closely related to glycerine, such as duoglycerine or polyglycerine. The relation of glycerine to soap influences the amount of hydrocarbon oils which can be retained in the system in a stable condition.

Emulsions of this kind may be obtained in a simple manner by first of all causing the formation of the two-component system hydrocarbon oil—glycerine containing the potassium oleate (which system is in the following for shortness sake called "auxiliary system") to take place substantially under exclusion of water or in the presence of small quantities of water only, and then homogenizing the system poor in water prior to its distribution in the water intended to be used as dispersion medium.

The amount of water which during formation of the auxiliary system can be present without decreasing the reversibility of the residue on evaporation is limited in the upper direction. (This small portion of water is for simplifying the description—in contradistinction to the portion of water constituting the continuous phase of the finally produced aqueous emulsion—called the adsorbed water). If the proportion of the adsorbed water reaches 40% by weight (here and in the following calculated on the basis of all constituents—soap, glycerine, oils and adsorbed water), from further dilution of the auxiliary system with water only coarsely dispersed emulsion will result, which separate within very short time. If the amount of adsorbed water contained in the auxiliary system is reduced to about 30%, the approximate limit is reached, from which downward under otherwise favorable conditions by means of this system aqueous hydrocarbon oil emulsions can be produced which are in quality far superior to those hitherto obtained. An auxiliary system containing 15% of adsorbed water will already give an emulsion, the residue on evaporation of which is nearly to its entirety reversible. Downward from 10% to about 3% the degree of dispersion increases gradually with the decreasing amount of adsorbed water, the reversibility of the dry residue remaining unaffected. A further decrease of the water contents does not cause any clearly noticeable difference of quality.

By allowing the emulsion to dry, it can be approximately stated, how much of adsorbed water had been present during the formation of the auxiliary system, the residue on evaporation being for this purpose compared regards qualities, particularly homogeneousness and transparency, with the residues on evaporation of a series of samples containing a disperse system of equal composition but with known increasing amounts of adsorbed water. The qualities of the emulsions obtained by diluting the residues on evaporation with water gives further directions for such comparison.

The production of watery hydrocarbon oil emulsions by means of such a disperse system soap-glycerine-hydrocarbon oil having little water is also apart from the problem of the commercial manufacture of emulsions giving a substantially reversible residue on evaporation, of industrial importance. So by this way hydrocarbon oil emulsions are obtained, which at the least show a higher degree of dispersion and a higher stability than could otherwise be brought about, if alkali oleates other than potassium oleate are used as emulsifying agents.

The particular qualification of the auxiliary systems poor in water for producing the emulsions in question can still be increased to a considerable extent by subdividing their particles and bringing them to an approximately equal order of magnitude by the method of homogenization. This after-treatment of the auxiliary system is indispensable for obtaining such aqueous emulsions (reversible or nonreversible ones) which show the highest degree of dispersion and stability. The hitherto practised homogenization of the finished emulsions does not lead to an equivalent result.

Two-component systems hydrocarbon oil-glycerine poor in water which contain soap as emulsifying agent, show a great tendency to set to jellies. In all cases the best results are obtained, if in fact the formation of a jelly is caused to take place, that can be effected for instance by subjecting a solution of soap in glycerine while gradually adding hydrocarbon oils, to the dispersing action of efficient mechanical means until the mixture becoming thicker and thicker will have turned into a jelly.

*Example*

4 kilogrammes of 98% glycerine are mixed with the quantity of potassium hydroxide required for the saponification of 1 kilogramme of oleic acid, which potassium hydroxide had been dissolved in water of half its own weight. The lye is heated up with the glycerine to about 70° C. and then 1 kilogramme of oleic acid is added to the mixture of lye and glycerine gradually. The reaction mixture is kept at the elevated temperature under agitation until neutralization has taken place. In this glycerine-soap solution by means of an agitator 10 kilogrammes of a light mineral lubricating oil are gradually distributed at ordinary temperature. A milkily troubled jelly will be formed, which by means of a suitable apparatus for instance a three-cylinder mill is treated until it will have acquired a glassy aspect and under the microscope little drops of oil are no more visible. The mixture thus homogenized can now be diluted with water in any desired proportion to give highly dispersed and exceedingly stable emulsions. If the water is allowed or caused to evaporate from such an aqueous emulsion, the latter will be retransformed into the same clear jelly which had been produced by the homogenization in the three-cylinder mill, and this residue may again be dispersed with water in any convenient proportion to form emulsions of like properties, that is to say, the residue on evaporation is perfectly reversible.

As to the proportions soap, glycerine and hydrocarbon oils the following is to be noted. The capacity of the soap-glycerine system of taking up hydrocarbon oil is limited. If the auxiliary system contains two parts by weight of glycerine and one part by weight of soap, the quantity of hydrocarbon oil retained in such strong manner, that emulsions of practically unlimited stability are formed, amounts to about 10 parts by weight. If the system contains 5 parts by weight of glycerine and one part by weight of soap, 17 parts by weight of hydrocarbon oil are fixed in a stable condition and a ratio of 10 parts by weight of glycerine and one part by weight of soap about 22 parts by weight of hydrocarbon oil are fixed. By further increase of the glycerine proportion the capacity of retaining hydrocarbon oils cannot be augmented any more to a noticeable extent. On the other hand this capacity will suddenly diminish, if the proportion of glycerine is reduced to less than 2 parts by weight for 1 part by weight of soap. If the auxiliary system contains less than 1½ parts by weight of glycerine to 1 part by weight of soap, more and more difficulties will occur in homogenization, so that this relation may for practical purposes be regarded as the lower limit. As to the question, which proportions of glycerine and soap are chosen within those limits, this depends on the one hand upon the purposes for which the emulsion is to be used and on the other hand upon economical consideration.

The excellent properties of the emulsions obtained as final products, particularly their high degree of dispersion, their stability and the reversibility of the residue on evaporation are—within the limits given by the requirements of practice—independent from the concentration of the emulsions.

If operations are carried out exactly in conformity to the example, but using stearic or palmitic acid instead of oleic acid, a considerable part of the oil will separate directly after the dilution with water has been performed. The emulsion shows under the microscope an essentially coarser dispersion and its residue on evaporation is only partly reversible. If instead of potassium oleate sodium oleate is used, the emulsion will directly after formation be about as good, but after having been allowed to stand at rest for several hours, it will have turned worse and then will also show oil separated therefrom. Moreover also the residue on evaporation of this emulsion is only to a small extent reversible. When using ammonium oleate, the operation according to the example will yield highly dispersed stable emulsions which distinguish from the emulsions prepared exactly according to the example only by the fact, that the residue on evaporation is not reversible.

Instead of hydrocarbon oils in all cases mixtures of such oils with animal or vegetable oils (such as neat's foot oil or olive oil) may be used with good result, but in such case any fatty acid which might be contained in these oils, ought to be neutralized, as free fatty acids will disturb the process.

It is not only known to emulsify hydrocarbon oils and other oils in water or watery solutions by means of soaps (either ready made soaps being used as emulsifying agents or the soaps being generated during the emulsification), but it has also been proposed to use glycerine besides soap for preparing emulsions. Thus for instance according to a known process emulsions are to be obtained by mixing in the cold or hot state water (100 parts), soap (15 parts), heavy oil of petroleum (30 parts minimum), potassium carbonate (8 parts) and glycerine (25 parts). But by this process only emulsions are obtained, which are coarsely dispersed and not stable and the residue on evaporation of which is not reversible.

In the following claims I use the term "alkali oleates" to include besides sodium oleate and potassium oleate also ammonium oleate.

What I claim is:—

1. Aqueous emulsions of hydrocarbon oils comprising a colloidally dispersed system of alkali oleate, glycerine and hydrocarbon oils, in which the glycerine is present in a ratio of at least two parts by weight of glycerine to one part by weight of alkali oleate.

2. Aqueous emulsions of hydrocarbon oils comprising a colloidally dispersed system of potassium oleate, glycerine and hydrocarbon oils, in which the glycerine is present in a ratio of at least two parts by weight of glycerine to one part by weight of potassium oleate.

3. In the art of producing aqueous emulsions of hydrocarbon oils the step which consists in emulsifying hydrocarbon oils and glycerine with alkali oleates in the presence of small quantities of water only (30% at the maximum calculated on the total reaction mass), the amount of alkali oleate being chosen in a ratio of at least two parts by weight of glycerine to one part of alkali oleate.

In testimony whereof I have affixed my signature.

RICHARD LANT.